Feb. 24, 1959  V. B. BATTENBERG ET AL  2,874,787
AIR DRIVEN POWER UNIT

Filed March 5, 1956  4 Sheets-Sheet 1

INVENTORS
VIRGIL B. BATTENBERG
FRED H. KATTERHEINRICH
BY ROBERT L. SAYRE

Craig V. Morton
THEIR ATTORNEY

Fig. 2

INVENTORS
VIRGIL B. BATTENBERG
FRED H. KATTERHEINRICH
BY ROBERT L. SAYRE

Craig V. Morton
THEIR ATTORNEY

Feb. 24, 1959  V. B. BATTENBERG ET AL  2,874,787
AIR DRIVEN POWER UNIT

Filed March 5, 1956  4 Sheets-Sheet 3

INVENTORS
VIRGIL B. BATTENBERG
FRED H. KATTERHEINRICH
ROBERT L. SAYRE
BY Craig V. Morton
THEIR ATTORNEY Feb. 24, 1959 V. B. BATTENBERG ET AL 2,874,787
AIR DRIVEN POWER UNIT Filed March 5, 1956 4 Sheets-Sheet 4

INVENTORS
VIRGIL B. BATTENBERG
FRED H. KATTERHEINRICH
BY ROBERT L. SAYRE

Craig V. Morton
THEIR ATTORNEY

United States Patent Office 2,874,787
Patented Feb. 24, 1959

2,874,787

AIR DRIVEN POWER UNIT

Virgil B. Battenberg, Dayton, Fred H. Katterheinrich, Troy, and Robert L. Sayre, Vandalia, Ohio, assignors to General Motors Corporation, Detroit, Mich., a corporation of Delaware Application March 5, 1956, Serial No. 569,470

16 Claims. (Cl. 170—68)

This invention relates to a power unit, and particularly to a ram-air-driven power unit with a variable pitch propeller having an automatic control for blade angle and means to feather and unfeather.

Increase of speed and range of flight has created a need in the aircraft industry for a dependable lightweight power source capable of delivering sufficient power independently of the engine to operate various aircraft components. An air-driven propeller can convert windmill or ram-air turbine force to torque adaptable for driving either electric generators or fluid pressure pumps. The propeller mechanism includes a fly-weight governor for rotating blades of the general type disclosed in copending applications, S. N. 420,277 Hook et al. and S. N. 420,278 Blackburn et al., both filed April 1, 1954, and assigned to the assignee of the present invention. The present invention is an improvement in such devices.

An object of this invention is to provide a ram-air-driven power unit operable above and below the sonic speed barrier of 1.00 Mach.

Another object is to provide a ram-air-driven power unit having variable pitch propeller blades with mechanism for moving the blades to a feather angle when operation is not desired.

Another object is to provide an air-driven unit with mechanism for automatically controlling the blade angle to maintain propeller speed within a predetermined operating range during windmilling.

Another object is to provide a braking mechanism in an air-driven power unit capable of selectively actuating feathering and unfeathering mechanism upon deenergization and energization thereof.

Further objects and advantages of the present invention will be apparent from the following description, reference being had to the accompanying drawings wherein a preferred embodiment of the present invention is clearly shown.

The aforementioned and other objects are accomplished in the present invention in an air-driven power unit including a streamlined spinner constituting a hub attached to a shaft with four variable-pitch propeller blades rotatably journalled therein. Torque output of the power unit is transmitted from the blades to the hub and to the shaft which passes through a hollow power unit support and into the output pad or takeoff connection. The four rotatably journalled variable-pitch propeller blades are connected by helical splines to four radially reciprocable annular flyweights mounted concentrically with the blade roots and each biased towards the axis of unit rotation by four separate compression springs.

In operation, a linear "droop" governor including the flyweights and springs controls blade angle and speed. The governor maintains speed within a predetermined operating range with controlled blade pitch angle while the flyweights may traverse their total range of movement. For every speed within the operating range, there is a position of the fly-weights, and, hence, a blade angle position at which the spring force and blade twisting moment are in balance with the spring and flyweight centrifugal forces transmitted to the blades through a left hand helical spline connection with each blade. Since centrifugal force increases with speed, the flyweights move outwardly as speed increases causing rotation of the blades only toward increase blade pitch angle. The radial linear movement of each flyweight is translated into rotary change of blade angle by preventing the flyweight from rotating about the blade root through cooperation of a linear track connection between each flyweight and the hub or spinner housing. As outlined above, each blade is rotated to change its pitch angle relative to the spinner hub by a plurality of helical splines on the inner periphery of the annular flyweights that engage mating splines on a blade root sleeve. Thus, blade angle change is a slave to movement of the flyweight with full governing excursion of the blade corresponding to the total movement of the flyweight. Since the governing excursion of the blades is sufficient to furnish the range of powers required of the unit over the comparable range of air speed and altitude conditions, all operation is at a speed within the governing range. At all times a blade coordinating means or slider maintains the pitch of all blades coordinated.

To allow the blades to be disengaged from the governor for feathering, the helical splines are only drivingly engageable along one edge thereof and the governor is allowed to drive the blades only toward increase blade angle. When edges of the splines are disengaged, the splines are spaced sufficiently far apart to permit movement similar to that of a "lost motion" connection. When the blades are moved to a feathered position the splines are separated. The aerodynamic twisting moment and centrifugal twisting of the blade always tend to decrease blade angle. Two additional springs are placed diametrically opposite to each other parallel to the unit centerline exerting a force against two diametrically opposed flange portions of the blade coordinating means or slider from the rear of the spinner housing assembly. In the present invention, the two additional springs aid the blade twisting force only for blade pitch angles above about 55°, that is, from 55° to 90° (feather). The blade coordinating slider always cooperates with the blade root sleeve having helical splines and a bifurcated flange portion engaging a rotatable bearing on the slider. The force of the two additional springs is small in the governing range but becomes large in the feathering range. Since the force of these springs is large at feather and high positive blade angles, they are used to drive the blades out of feather and to provide an elastic feather stop. At feather, the blades are at a positive angle approximating 90° in alignment with the unit center-line. A positive or high pitch feather stop is also provided by an annular portion of the coordinator slider in striking a bearing journalling the spinner housing on the stationary support. A positive low pitch stop is provided by a needle thrust bearing axially spaced about a portion of a master gear engageable by an annular sleeve portion of the blade coordinating slider.

The feather system includes a feathering plate having two nuts thereon which threadedly engage two high lead screws rotatably journalled to the rear of the spinner housing and a forwardly disposed gear plate assembly fitted into the spinner, or hub. The high lead screws are located diametrically opposite each other in axes parallel to the diametrically opposite additional springs acting on the coordinating slider. However, the screws are in quadrants shifted 90° from the springs and pass through apertures of diametrically opposed radial flanges on the slider. The feathering plate is held away from the blade mechanism during governing by light springs between the feathering plate and rear of the hub. The high lead screws carry a feathering drive gear which meshes with a master gear. Cooperable with the master gear are a brake plate, brake spring means, and direct current brake solenoid which are all fixed to a stationary power unit support except that the spring means moves the brake plate axially away from the solenoid when the latter is deenergized for feathered positioning of the blades. Deenergization of the brake solenoid causes movement of the feathering mechanism until the coordinator slider comes to rest against the springs forming the resilient feathering stop as outlined above.

To feather the blades, the pilot only deenergizes the brake solenoid. The brake spring moves the brake plate axially against the master gear. Engagement of the brake plate with the master gear stops free rotation of the master gear with the rotating hub. The high lead screws remain rotatably journalled as outlined above. The braking force on the master gear provides a positive reaction force so that the fixed master gear effects rotation of the high lead screws relative to the rotating hub through the feathering gears attached to the high lead screws. Rotation of the high lead screws is converted to translational movement of the feathering plate through each of the two nuts threadedly engaged on the high lead screws and reciprocable thereon. During unfeather operation, the feathering plate is not subject to the effect of brake drag or reaction force on the master gear and the light springs between the feathering plate and rear of the hub keep the feathering plate out of engagement with the blade coordinating slider because the force of the springs effects relative reaction movement to cause the nuts on the high lead screws to move over the high lead screws shifting the feathering plate out of engagement with the blade coordinator slider. The feathering plate is moved during feathering axially against the light spring load until the plate picks up and engages the blade coordinating slider. Further movement of the feathering plate moves the blade coordinating slider axially causing rotation of the blade sleeve adapter through engagement of the bifurcated flange portion thereof with the rotatable bearing on the slider. This rotation lifts or disengages the helical splines from each other, taking the blades from the governing mechanism. The blade coordinating slider is moved with the blades to feathered position against the elastic feather stop of the diametrically opposite springs mentioned earlier. In feathering from any flight condition, the unit stops rotation when the blades have reached a high enough angle such that the windmilling torque decreases to a value insufficient to further compress the diametrically opposite elastic feather stop springs. Feather angle, therefore, increases with increasing impact pressure to closely approximate the minimum drag angle at high impact pressures.

To unfeather the blades, the pilot energizes the brake solenoid releasing the gearing from reaction force or drag of the spring-engaged brake plate. With the brake released from the feather-effecting mechanism, the power unit is free to rotate because brake reaction force is no longer applied to the gearing while the elastic feather stop springs urge the blade coordinating slider forward thereby moving the blades out of feather position to a pitch angle at which the blades bite into the wind and rotation begins with the diametrically opposite springs driving the blade coordinating slider and mechanism to a blade angle position relative to the wind or air flow due to which there is sufficient rotative speed and centrifugal twisting moment on the blades to carry on in the operative governing range of the unit. The governor becomes operative and disengages the blades from the feathering mechanism as the splines become engaged. The governor tends to increase blade angle with a linear "droop" characteristic as centrifugal force increases with speed reacting with the aerodynamic twisting moment and centrifugal twisting of the blade tending to decrease blade angle.

When using the unit with fluid pressure systems, loading of the windmilling air-driven power unit must be delayed to permit torque build-up to within operating speeds. A flow responsive shutoff valve in a by-pass line around a fluid pressure pump is used for this purpose.

Figures 1, 7:
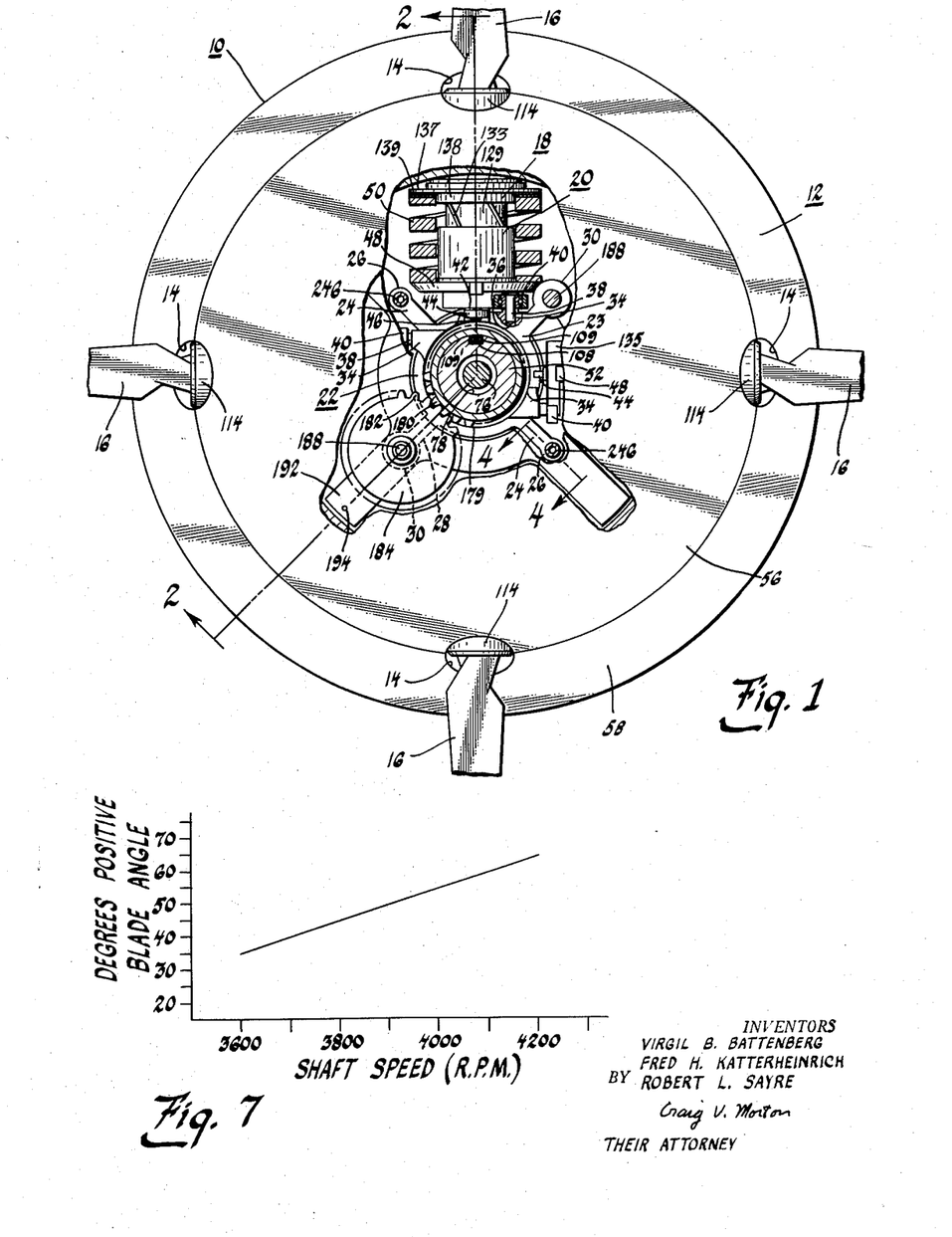
Figure 1 is a front elevational view, partially in section, of an air-driven power unit incorporating the present invention.
Figure 7 is a graphical representation of the mechanical linear "droop" governor characteristic plotted as shaft speed in revolutions per minute against positive blade angle in degrees.
Figure 4:
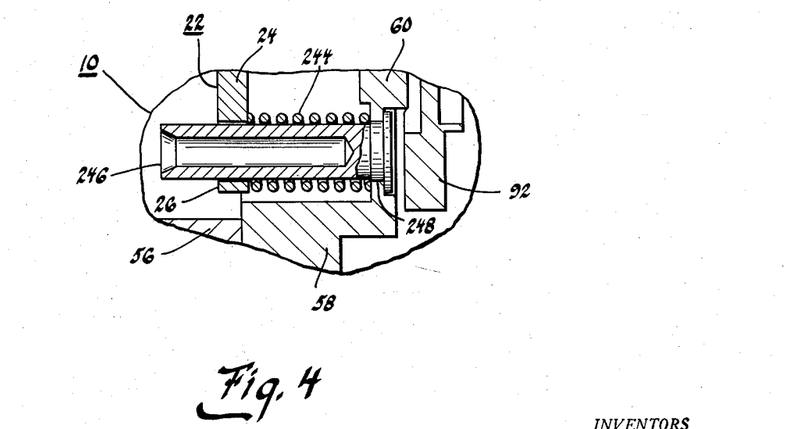
Figure 4 is a fragmentary sectional view along line 4—4 of Figure 1 showing unfeather biasing means or the resilient feather stop in the present invention.

With particular reference to Figure 1, a ram-air-driven power unit generally indicated by the numeral 10 is shown including a hub, or spinner, housing assembly 12 provided with a plurality of hub apertures 14 in which propeller blades 16 are rotatably journalled. The nose portion of the spinner housing assembly 12 has been partially cut away together with some of the mechanism operably disposed therein to show a blade and sleeve assembly, generally indicated by the numeral 18, described later in detail, in conjunction with a mechanical "droop" governor, generally indicated by the numeral 20, the operation of which is also explained in further detail below. Figure 1 also shows a blade coordinator means or slider 22 provided with two pairs of oppositely extending diametrically opposed flanges extending from an annular sleeve portion 23 thereof. One pair of these flanges 24 is provided with an annular apertured portion 26 cooperating with resilient biasing means not visible in Figure 1, but later described in further detail as shown in Figure 4, for urging the blade coordinator means 22 in a forward direction toward the nose of the spinner housing assembly. Another pair of oppositely extending flange portions 28 are formed integrally with the blade coordinator slider 22 and include apertured annular portions 30 through which a pair of feathering drive gears 184 are rotatably journalled.

For purposes of illustration, only one feathering drive gear 184 is shown in Figure 1 extending through the apertured annular portion 30 of flange 28 of slider 22 and the other gear 184 has been removed to show a cutaway portion of a platform 34 formed immediately adjacent each flange portion 24 and 28 extending in radially opposite directions. Each platform 34 is provided with a bore 36 which receives a pin 38 press-fitted or otherwise attached therein. The pin 38 provides a journal support for a roller bearing 40 assembled therewith. Each blade is provided with a blade and sleeve assembly 18 adapted to be cooperable with the roller 40, the purpose and operation of which is to be described in further detail (see Figures 2 and 3) in conjunction with the feathering of blades 16. The blade coordinator slider 22 is reciprocable in an axial fore and aft direction relative the sleeve assembly 18 with a roller 42 attached to a pin 44 of the blade sleeve assembly 18 cooperating in a slot 46 formed adjacent each platform portion 34 and extending longitudinally in the sleeve portion 23 of the blade coordinator slider 22. The pin 44 is attached to the blade and sleeve assembly 18 in a manner to be described in further detail below. Figure 1 shows a flyweight 48 attached to the root of the blade 16 as will be explained and a compression spring 50 forming part of the mechanical linear "droop" governor 20 determining blade angle relative to the speed at which the power unit is driven by windmilling.

Figure 2:
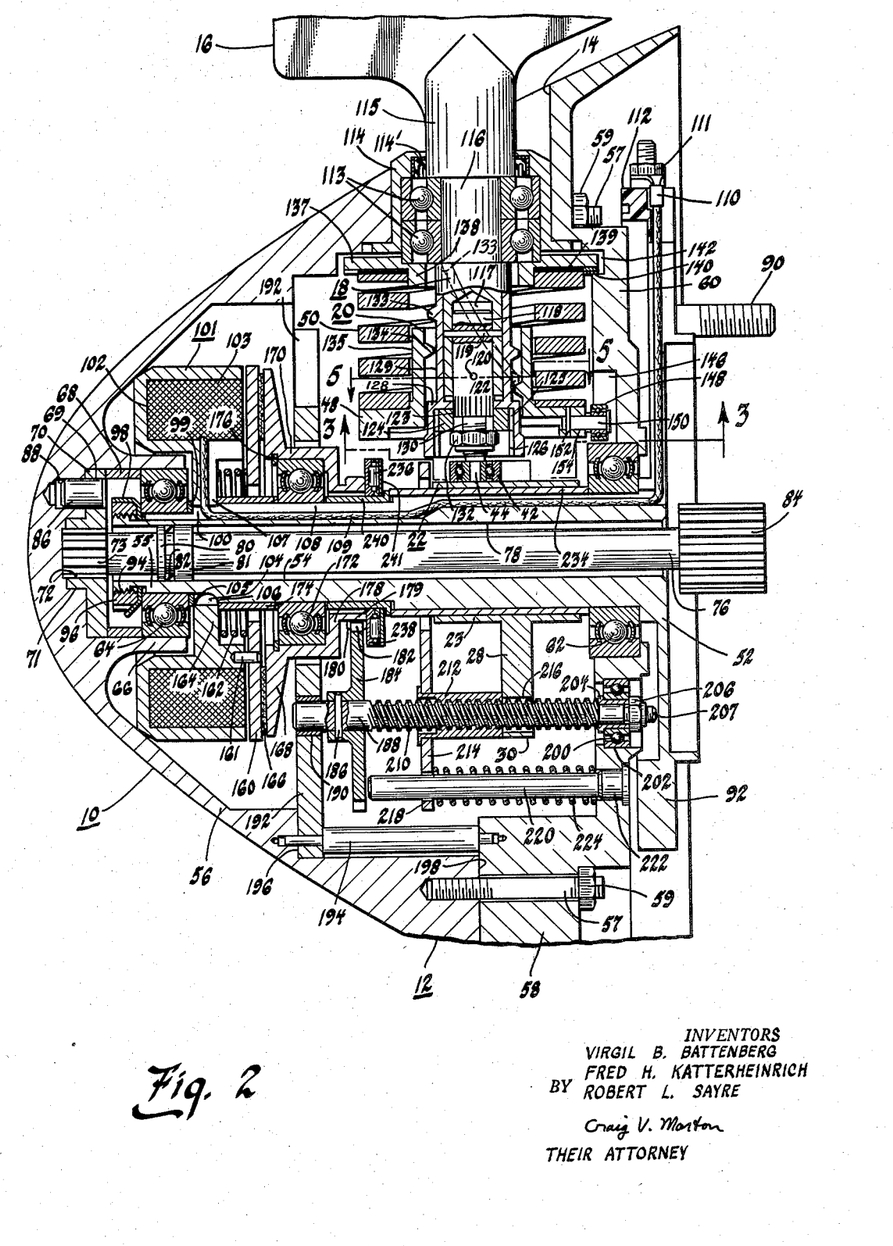
Figure 2 is a plan view, partially in section, along line 2—2 of Figure 1 showing governor and feathering mechanism in the air-driven power unit.

Figure 2 is a plan view, partially in section, along line 2—2 of Figure 1 showing the mechanism in further detail including the parts described above. Figure 2 shows a stationary shaft assembly or fixed support 52 having a longitudinally extending sleeve, or support member, 54 on which the spinner housing assembly, generally indicated by the numeral 12, is rotatably journalled. The spinner housing assembly comprises a front spinner portion, or member, 56 fitted with a plurality of rearwardly protruding threaded studs 57 extending through apertures of a rear spinner portion, or member, 58 and joined therewith by nuts 59 threaded onto the studs 57. The rear annular spinner portion 58 is provided with an inwardly extending radial wall portion 60 rotatably journalled with respect to the stationary shaft assembly, or fixed support, 52 by means of a roller bearing 62. The forward spinner portion 56 is rotatably journalled with respect to a forward portion 55 of the fixed support 52 by means of a roller bearing 64 disposed between a portion 55 of support 52 and a longitudinal rearwardly extending annular portion 66 formed with the front spinner member 56. Fitted radially within the annular portion 66 is a bearing spacer 68 serving to locate a drive plate 70 having an aperture 69 and extending into a forward recess 71 of the forward spinner member 56. The drive plate 70 is provided with internal straight splines 72 cooperating with external straight splines 73 of a driver shaft 76 rotatably disposed in a hollow longitudinal bore 78 of the fixed support 52. The driver shaft 76 is provided with a pair of annular radially extending lands 80 and 81 between which a sealing means 82 is provided as a hydraulic packing. The driver shaft 76 is provided with a power take-off or pad 84 splined externally to cooperate with a generator or hydraulic pump which the air-driven power unit will drive. The power shaft 76 is rotated upon windmilling of the blades 16 transmitted through the hub, or spinner, housing assembly 12 by the splined connection 72—73 with the drive plate 70 by means of a connecting pin 86 press-fitted into a longitudinally extending bore 88 of the forward spinner member 56 and extending into the aperture 69 of the drive plate 70.

Figure 2 also shows one of six mounting studs 90 attached to a radially-extending rear annular mounting flange portion 92 of the fixed support 52. The forward end 55 of the sleeve 54 of the fixed support 52 is provided with external threads 94 which receive a nut 96 in threaded engagement to force a retaining washer 98 into engagement with the bearing 64 rotatably journalling the forward spinner portion 56 with respect to the fixed support 52. A shim 99 is provided at the side of the bearing 64 opposite the retaining washer 98 to fit against an annular shoulder portion 100 of the fixed support 52.

Also rigidly attached to the fixed support 52 is a solenoid housing assembly 101 having an annular recess 102 for receiving a solenoid winding 103 therein. The solenoid housing 101 is rigidly attached to the fixed support 52 by means of a Woodruff key 104 disposed between a keyway 105 formed in the shoulder portion 100 of the outer periphery of sleeve 54 with the fixed support 52 and a slot 106 in a central aperture of the solenoid housing assembly 101. The solenoid housing assembly 101 has a radially extending slot 107 and the stationary fixed support 52 is provided with a longitudinal groove 108 in which lead wiring 109 and 109' for the solenoid 103 is embedded. The lead-in wiring is provided with a terminal clip, such as indicated by numeral 110, attached by a nut, screw and washer assembly 111 to a terminal block assembly 112 disposed on the outer periphery of the radially extending annular flange portion 92 of fixed support 52. A suitable electrical power circuit or battery source with an actuating switch for the pilot (not shown) is connectible to the terminal block assembly 112 for selectively actuating the solenoid 103. Figure 1 also shows the groove 108 with the wiring 109 and 109' therein located with the fixed support 52.

Figure 2 further shows a pair of bearings 113 coaxially disposed back to back for rigidity in a bearing retainer or bearing retention cup 114 with seals 114' provided to rotatably journal reduced diameter portions 116 of each blade root 115 of blades 16 with respect to the spinner housing assembly 12 between front and rear spinner members 56 and 58, respectively. Each of the blades 16 is rotatably journalled with respect to the spinnner housing assembly in this manner.

The blade and sleeve assembly generally indicated by the numeral 18 in Figure 1 is shown in detailed cross section in Figure 2 and comprises the following parts. The reduced diameter portion 116 of blade root 115 is provided with a longitudinal bore 117 into which a stud 118 is fitted and retained by means of a pair of pins 119 and 120 press-fitted through suitable radial apertures provided at right angles to each other through the stud 118 and reduced diameter portion 116 of the blade root 115. The stud 118 protrudes from the base 117 and provides a plurality of external straight splines 122 which are engageable with a plurality of internal straight splines 123 on an indexing ring 124 slidable over the stud 118. The indexing ring 124 also is provided with external straight splines 125 cooperable with internal straight splines 126 of a cylindrical blade sleeve adapter 128 fitted over the periphery of the reduced diameter portion 116 of blade root 115 as the indexing ring 124 is fitted over the splines 122 of stud 118. The stud 118 is provided with an annular threaded portion 130 onto which a nut 132 is tightly threaded retaining the indexing ring 124 and blade sleeve adapter 128 in assembled relationship with the reduced diameter portion 116 of the blade root 115. The blade sleeve adapter 128 has an integral sleeve portion 129 which abuts the bearing 113 serving to rotatably journal the blade 16. The sleeve portion 129 also serves to retain pins 119 and 120 in apertures so as to maintain stud 118 in assembled relationship in the bore 117 of the reduced diameter portion 116 of the blade root 115.

The blade sleeve adapter 128 is provided with a plurality of external helical splines 133 advancing longitudinally over the sleeve portion 129. The flyweight 48 (also shown in Figure 1) is provided with internal helical splines 134 on an integral longitudinally extending sleeve portion 135 thereof. The spring 50 forming part of the flyweight governor 20 is compressed between a flange portion 136 of the flyweight 48 and a spring pilot 137. The spring pilot 137 has an annular sleeve 138 abutting the bearing 113. As shown in Figure 2, a plurality of annular shims 139 may be slipped between the spring pilot 137 and compression spring 50 to adjust the spring force thereof for proper governing range of each blade assembly. Shims 140 inserted between shims 139 and/or spring pilot 137 relative to the annular slot or recess 142 of wall 60 of rear spinner portion 58 prevent radial shifting of the blade assembly relative to the hub after assembly therein. The structure just described is advantageous in that each blade assembly can be installed and removed as a balanced unit in the hub or spinner assembly 12 between portions 56 and 58. The mass of the spring 50 and flyweight 48 both form part of the flyweight governor 20 disposed with the blades 16. The compression spring 50 is disposed between the spring pilot 137 and the flyweight 48 to be compressed therebetween as the flyweight 48 traverses longitudinally along the reduced diameter portion 116 with root 115 of the blade 16. The longitudinal movement of the flyweight 48 is limited in a radial direction relative to the centerline of the unit 10 by means of a radial slot or recess 146 formed in the rear inwardly extending radial wall 60 of the rear spinner portion 58 for each of the four blades used in the present power unit 10. A roller bearing 148 journalled on a shaft 150 attached by a pin 152 fitted thereto through an aperture 154 of the flange portion 136 of flyweight 48 cooperates with the recess 146 to prevent the flyweight 48 from rotating as centrifugal force causes the flyweight to compress the spring 50 in a radially outward direction longitudinally along the blade root 115.

The cooperating helical splines 133 and 134 of the blade sleeve adapter 128—129 and flyweight 48, respectively, when engaged in the governing range as described below, cause the blade 16 to be rotated for pitch changing movement between high and low pitch positioning as the flyweight 48 moves radially outwardly in a linear path controlled by the cooperating roller 148 and recess 146. The structural mass represented by the flyweight 48 and compression spring 50 provides a linear "droop" relationship between the speed of the shaft 76 rotated through the spinner housing assembly 12 due to windmilling of the blades 16 in a proportion graphically represented in Figure 7. The governor maintains speed within a predetermined operating or governing range with controlled blade pitch angle while the flyweights move reciprocally as determined by roller 148 traversing the radial path of recess 146 in the total range of movement. For every speed within the operating range, there is a position of the flyweight 48, and, hence, a blade angle position at which the force of spring 50 and blade twisting moment due to aerodynamic and centrifugal twisting moments thereon are in balance with the spring and flyweight centrifugal forces transmitted to the blades through the splines 133—134 engageable to interconnect each blade and governor as outlined above.

The splines 133—134 are left hand helical splines as indicated by the phantom lines in Figure 2. In the preferred embodiment illustrated in Figure 2, three splines progress peripherally and are spaced sufficiently far apart to permit movement of the "lost motion" type when the splines are disengaged. The phantom line of Figure 2 aids in visualizing the appearance of a spline such as 133 on the sleeve 129 of blade sleeve adapter 128 in proximity to engagement with a cooperable spline of a corresponding number of left hand helical splines such as 134 on sleeve portion 135 of flyweights 48. For purposes of clarity, no phantom of a spline such as 134 is shown but the phantom of 133 is shown nearly in engagement with the actual cross section of a spline such as 134.

Figures 5, 6:
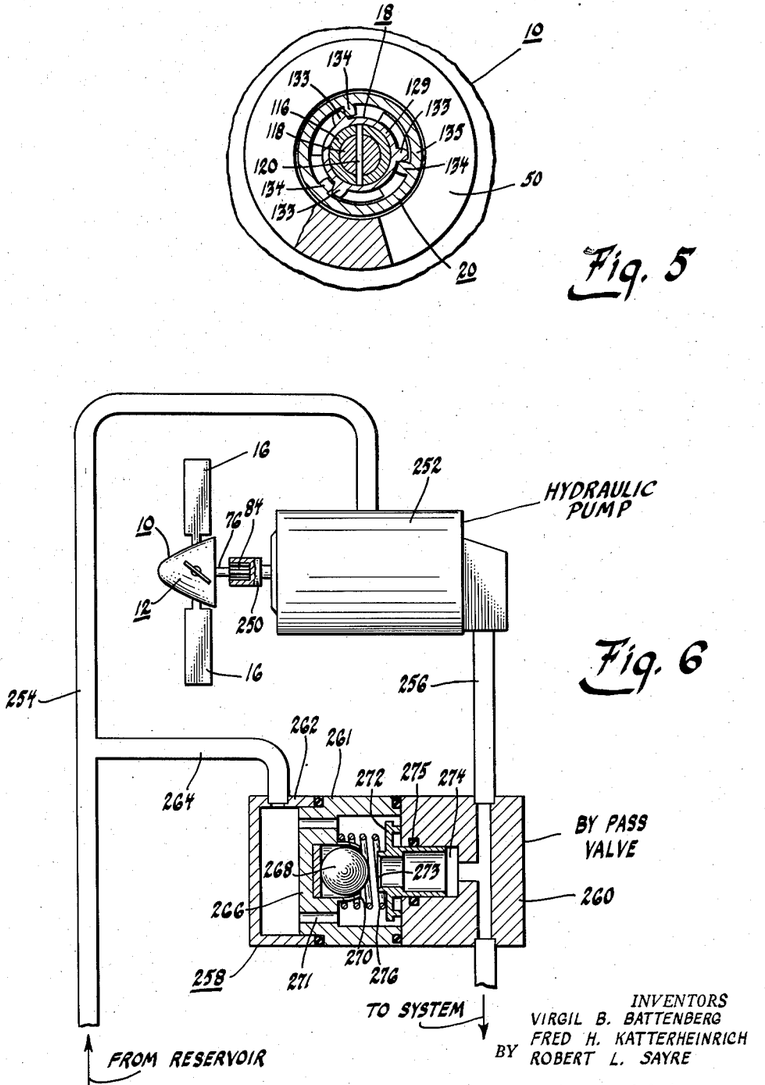
Figure 5 is a fragmentary sectional view along line 5—5 of Figure 2 showing the driving engagement of the left hand external helical spline threads of the blade sleeve adapter secured to the blade root with comparable helical threads on the internal periphery of the governor flyweight which can only drive a blade toward increase blade pitch angle.
Figure 6 is a schematic view of an application of the air-driven power unit in an hydraulic system with a bypass for the fluid pressure pump in the system.

Figure 5 is a fragmentary sectional view along line 5—5 of Figure 2 looking radially inwardly. The phantom of splines 133 is used as the positioning thereof for purposes of clarity and understanding to illustrate the appearance in an end view of the engagement of the splines 133—134 during the operating or governing range of the flyweight 48 relative to the blade sleeve adapter 128—129. Figure 5 thus shows a pin such as 119 or 120 connecting stud 118 to the reduced diameter portion 116 of the blade 16. There are three left hand helical splines 133 engaging the one edge of corresponding mating splines 134 on the inner periphery of sleeve portion 135 of flyweight 48. The spring 50 is also shown partially broken away in Figure 5.

The partially sectioned view of the blade sleeve assembly in Figure 2 is shown in a high positive pitch or feathered position of blades 16 so that splines 133 and 134 are spaced apart from each other due to disengagement thereof as the feathering mechanism effects rotation of the blades to the feathered position. When the blades 16 are unfeathered, the splines 133 will move radially into engagement with splines 134 in the proximity of the phantom of spline 133 due to rotation imparted to the blade sleeve adapter 128—129 in a manner described below. The flyweight 48 is free to move radially as speed increases within the radial path controlled by roller 148 in slot 146. Splines 133—134 engage as illustrated in Figure 5. Due to the left hand splining, as increase of speed causes flyweight 48 (and the mass of spring 50) to move radially outwardly due to centrifugal force in opposition to the force of spring 50 resisting further compression, the splines 134 on sleeve 135 of flyweight 48 cannot rotate themselves due to the linear cooperating path of roller 148 in slot 146 and impart rotative motion to an increase pitch position of blade 16 through splines 133. This rotation occurs in the governing range so as to effect pitch position of the blades 16 because the blade sleeve assembly is rotatably journalled in the hub but fixed as to radial movement by cooperation of shims 139—140 in groove 142 as outlined above. As indicated earlier, the balance of forces determining blade pitch angle in the governing range by cooperation of the splines also takes into consideration the aerodynamic twisting moment of ram-air striking the exposed surface of the blades 16 and the centrifugal twisting moment of the blades, both of which tend to hold the blades 16 to a low pitch angle and operate against the governor which can drive the blades 16 only to a high pitch angle. The feathering mechanism when energized to operate as is described below turns the blades 16 mechanically to an even higher blade pitch angle or feathered position away from engagement of the mating splines.

The feathering mechanism in accordance with the present invention comprises a gearing operably disposed in the spinner housing assembly 12 including the following parts. The solenoid brake assembly 101 with the solenoid 103 is disposed in the spinner housing assembly such that a solenoid disc, or braking means, 160 may be attracted to complete a flux path emanating from and returning to the solenoid 103 when it is energized through wiring 109—109'. One or more pins such as 161 are fitted between apertures in disc 160 and the stationary solenoid housing assembly 101 to prevent rotation of disc 160 while permitting axial movement relative thereto. A compression spring means 162 is disposed concentrically about the sleeve portion 54 of fixed support 52 between an inwardly extending radial flange 164 of the solenoid housing 101 and the solenoid disc 160 biasing the disc out of engagement with the solenoid housing 101. As long as the solenoid 103 is energized, the blades 16 are free to seek any equilibrium pitch angle as determined by the flyweight governor composed of flyweight 48 and compression spring 50 for each of the blades in the governing range. As soon as the solenoid 103 is deenergized, the compression spring 162 forces the solenoid disc 160 axially rearwardly over guides such as pin 161 into engagement with a solenoid braking surface of suitable friction material 166 disposed on the solenoid disc 160 to engage a radially extending annular flange 168 of a master gear 170 rotatably disposed about the sleeve portion 54 of fixed support 52 by a roller bearing 172. A circular spacer 174 and snap ring 176 engageable in a groove in the flange 168 of the master gear 170 retain the bearing 172 in spaced relationship with respect to the brake solenoid assembly 101 engageable against an inwardly extending radial shoulder portion 178 of the master gear 170. The master gear is provided with a longitudinally extending sleeve portion 179 provided with a plurality of external gear teeth 180 constantly in mesh with a plurality of teeth 182 of a feathering drive gear 184.

The feathering drive gear 184 is rigidly attached by a pin 186 to one end of a high lead screw shaft 188 which, in turn, is rotatably journalled in a bushing 190 fitted into an aperture of a gear plate assembly 192 attached by a stepped pin 194 fitted between an annular shoulder 196 of the forward spinner portion 56 and the shoulder 198 of the rear spinner portion 58. The other end of the high lead screw shaft 188 is rotatably journalled by means of a roller bearing 200 in a shouldered aperture 202 formed in the radially extending rear wall portion 60 of the rear spinner portion 58. A shoulder bushing 204 provides a journal support between the bearing 200 and high lead screw shaft 188 with the bearing 200 being held in proper spaced relationship on the screw shaft 188 by means of a nut 206 fitted onto a threaded portion 207 of the screw shaft 188.

As mentioned in the explanation of structure shown in the cut-away portion of the view in Figure 1, two of these high lead screws 188 and feathering drive gears 184 are disposed diametrically opposite each other with similar journalling supports being provided in the radial wall portion 60 of the rear spinner portion 58 and in the gear plate assembly 192. Each high lead screw shaft 188 is provided with a high lead thread 210 cooperating with an internally threaded high lead nut 212 rigidly attached to a feathering plate 214. The nut 212 is movable on the high lead screw thread 210 in a rearward, or feathering, direction (to the right as viewed in Figure 2) to engage the flange portion 28 of the blade coordinating slider 22 shown extending in diametrically opposite radial directions in the view of Figure 1. The screw shaft 188 extends through an aperture 216 formed in the annular portions 30 of the flanges 28 on the blade coordinating slider 22. The feathering plate 214 is provided with two diametrically opposed apertures 218 in radial alignment with the mounting of nut 212 in the plate 214 so that a pair of studs 220 press-fitted into apertures 222 formed in the radially inwardly extending wall 60 of the rear spinner portion 58 may slide or pass therethrough. A compression spring 224 is disposed between the wall 60 and the feathering plate 214 biasing the plate 214 at diametrically opposite ends thereof and the internally threaded nuts 212 attached thereto in a forward direction out of engagement with the flange portion 28 of blade coordinating slider 22. The springs 224 are compressed when brake solenoid 103 is deenergized causing braking engagement of disc 160 with master gear 170. Positive braking engagement provides a reaction force causing rotation of the feathering driving gear 184 with screw shaft 188 that moves nut 212 rearwardly (as shown in Figure 2) over high lead threads 210 to engage and shift the blade coordinating means 22 rearwardly to feather the blades 16 by rotation imparted thereto through rollers 40 on the coordinating slider means 22 with a bifurcated portion 230 of the blade sleeve adapter 128.

Figure 3:
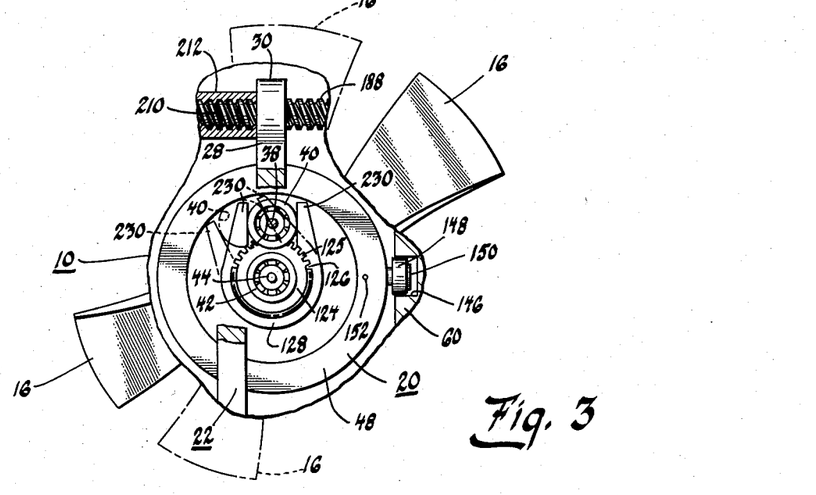
Figure 3 is a fragmentary view along line 3—3 of Figure 2 showing the connection between the blade coordinating slider and blade adapter sleeve upon engagement in feathering position.

Figure 3 is a fragmentary end view along line 3—3 of Figure 2 illustrating interconnecting parts between the high lead screw 188 and the blade coordinating slider 22 and blade adapter sleeve 128 in a feathered position. The nut 212 having the internal high lead threads cooperating with high lead threads 210 of screw shaft 188 is shown engaging the annular portion 30 of flange 28 (broken away from the blade coordinator slider 22). The blade sleeve adapter 128 is shown having the bifurcated portion 230 extending radially from the blade sleeve adapter 128 engageable with the roller 40 journalled by the pin 38 to the platform portion 34 of the blade coordinator slider 22 as shown in Figure 1. The blade coordinator sleeve 128 as seen in Figure 3 is shown with its internal straight splines 126 engaging external splines 125 of indexing ring 124 (attached by nut 132 to the threaded portion 130 of stud 118 fitted by pins 119 and 120 to the reduced diameter portion 116 of blade root 115 as shown in Figure 2). Figure 3 also shows the roller 42, mentioned previously, which slides in the longitudinally extending groove 46 of the blade coordinating slider 22 as shown in Figure 1. The roller 42 is mounted on a pin portion 44 formed integral and extending axially from the threaded portion 130 of stud 118 in the blade and sleeve assembly as outlined above. Figure 2 shows the blade 16 in a feathered position, that is, with the airfoil of the blade 16 in substantial alignment with the axis of shaft 76. Figure 3 shows the bifurcated portion 230 of the blade sleeve adapter 128 also in feathered position.

Figure 3 also shows a phantom representation of relative movement between the bifurcated portion 230 with respect to the roller 40 attached to the blade coordinator slider 22 moving toward an unfeathered position. Figure 3 again illustrates the roller 148 which is linearly movable in the recess 146 of the rear wall 60 of the rear spinner portion 58 preventing rotation of the flyweight 48 about the axis of the blade root 115—116 as described above. The blades 16 are shown in the feathered position corresponding to the representation of the bifurcated portion 230 engaging roller 40 and the phantom positioning of blades 16 corresponding to the phantom positioning of the bifurcated portion 230 and roller 40 in accordance with the unfeathering movement described above.

The blade coordinating slider 22 is capable of moving longitudinally along the axis of the fixed support 52 and shaft 76 over a plain bearing 234 as shown in Figure 2. A positive feathering or high pitch stop is formed by the bearing 62 when the blade coordinating slider 22 engages the bearing 62 in rearward motion (to the right as shown in Figure 2). The low pitch stop is provided by a needle bearing 236 disposed in a radially extending raceway 238 around a flanged spacer 240 fitted between the roller bearing 172 and plain bearing 234 on the sleeve portion 54 of fixed support 52. A washer 241 provides an engaging surface between blade coordinating slider 22 and the needle bearing 236.

The blade coordinating slider 22 is shown in Figure 1 with oppositely extending flange portions 24 disposed at right angles to the oppositely extending flange portions 28 cooperable with the blade feathering nut 212 and plate 214. Figure 4 is a fragmentary sectional view along line 4—4 of Figure 1 showing unfeathering biasing means (and resilient feathering stop means) disposed between the radially inwardly extending rear wall 60 and the annular portion 26 of flange portion 24. A compression spring 244 is disposed between the annular portion 26 of flange 24 and the wall 60 about a stud 246 press-fitted into an aperture 248 in the wall 60 as shown in Figure 4. Springs are disposed at diametrically opposite sides of the flange portions 24 as described above, each serving to bias the blade coordinator sleeve 22 into a sliding movement toward an unfeathered position as indicated by the phantom representation of bifurcated portion 230 and cooperating roller 40 as described in Figure 3 when the solenoid 103 is energized to disengage disc 160 from braking engagement with master gear 170. Solenoid 103 of the brake solenoid assembly housing thus functions as a brake release means for unfeathering the air-driven power unit.

In operation, whenever the solenoid 103 is energized by the pilot by closing a switch of an electric circuit (not shown), the solenoid disc 160 will be attracted into engagement with the solenoid housing assembly 101 causing the braking surface 166 of disc 160 to be disengaged from the master gear 170. Energizing the solenoid 103 thus will permit the master gear 170 to rotate freely on bearing 172 about the fixed support 52 with no reaction force of frictional engagement or braking drag placed thereon by the disc 160. With the solenoid 103 energized, the meshing teeth 180 and 182 between the master gear and feathering drive gear 184 are free of the previously mentioned braking drag and reaction force to permit rotation of the master and feathering drive gears. Due to force of springs forming the elastic feather stop, including the springs 244 each serving to bias the blade coordinator sleeve into a sliding movement toward an unfeathered position as indicated by the phantom representation of bifurcated portion 230 and cooperating roller 40 as described with Figure 3, and the springs 224 each biasing the feathering plate 214 further in a forward direction out of engagement with the flange portion 28 of blade coordinating slider 22, the slider 22, plate 214, and nuts 212 attached to the plate 214 as mentioned earlier are urged forward with the nuts 212 being moved longitudinally effecting rotation of the high lead screws 188 in a direction causing the nut 212 to move over high lead threads 210 in a forward direction out of engagement with the annular portion 30 of flange 28 on blade coordinator slider 22. The forward motion of the feathering plate nut 212 is caused by urging of the compression springs 224 disposed between the plate 214 and wall 60 of the rear spinner portion 58 of the spinner housing assembly 12 when solenoid 103 is energized and the springs 244 urge the blade coordinating slider and mechanism to a blade angle position at which air or wind striking the blades effects sufficient rotative speed of the hub and blades to carry on in the operative governing range of the wind driven unit as mentioned earlier in this disclosure. As soon as the nut 212 is moved to a disengaged position with respect to the flanges 28 of slider 22, the pitch angle of the blades 16 is entirely dependent upon the windmilling speed effected by impact of the blades with the onrushing air. Then the flyweight 48 and spring 50 disposed with each blade root 115 act as a linear "droop" governor determining the blade angle proportional to shaft speed in revolutions per minute. At every blade angle there is an equilibrium of the centrifugal forces acting on the blade 16 as balanced out by the governor comprising the flyweight 48 and spring 50. The linear relationship, as mentioned above, is illustrated graphically in Figure 7.

To effect operation for feathering of the blades 16 in the emergency power unit 10 of the present invention, the pilot deenergizes the solenoid 103 by opening the switch of an electric circuit (not shown) causing the compression spring means 162 to urge the solenoid disc 160 away from the solenoid assembly 101. Thereupon, the braking surface 166 engages the annular flange portion 168 of the master gear 170 as disc 160 slides axially over guides such as pin 161. A reaction force from stationary connection through disc 160, pin 161, and solenoid housing assembly 101 is transmitted through the cooperating teeth 180—182 between the master gear 170 and feathering drive gear 184, respectively, causing a rotation to be imparted to the screw shaft 188. The rotation of screw shaft 188 is in a direction carrying the internally threaded nut 212 into engagement with and moving the slider 22 on annular portions 30 of flanges 28 to impart movement thereto in a feathering or rearward direction as shown in Figure 2 in opposition to the biasing of springs 244 disposed between the wall 60 and annular portions 26 of flanges 24 on slider 22. The rearward movement of slider 22 is in a longitudinal direction coaxial with the axis of shaft 76 determined by the four rollers 42 rotatably journalled about the pins 44 of stud 118 attached to the reduced diameter portion 116 of blade roots 115 cooperating in the longitudinal grooves 46 of sleeve portion 23 of the blade coordinator 22. In effect, the springs 244 shown in Figure 4 provide a resilient feathering stop which stops rearward motion of the slider 22 at a pitch angle position of the blades 16 at which the aerodynamic forces of the air striking the blades 16 are at an equilibrium with the spring force 244 and mechanical frictional engaging forces of the gearing parts in the feathering means of the present invention.

Figure 6 shows a schematic representation of a practical application of the emergency power unit in the present invention including the spinner housing assembly 12 and blades 16 attached at the power take-off of shaft 76 through splines 84 to a hydraulic pump fitting 250 operatively connected in a hydraulic pump generally indicated by the numeral 252. Because it is necessary for the present emergency power unit to build up a sufficient speed to provide a starting torque sufficient to overcome initial pumping resisting forces in the hydraulic pump 252, it is necessary to incorporate some means of postponing loading of the windmill emergency power unit until a speed well beyond 375 R. P. M. is reached. Therefore, a by-pass line together with a by-pass valve is shown disposed between a conduit 254 connected between the hydraulic or oil reservoir and hydraulic pump 252. The hydraulic pump operates to supply fluid through conduit 256 to the control system of the aircraft and the by-pass valve, generally indicated by the numeral 258, is provided between the conduits 254 and 256 as shown in Figure 6.

The by-pass valve includes a by-pass valve cap 260 suitably attached to a by-pass valve member 261 and cover 262 provided with a passage fitting 264 connected with the conduit 254. The valve member 261 is provided with a centrally located axially extending core 266 on which a ball check valve member 268 is retained by a peened-over retainer cap 270 as shown. Drilled apertures or passages 271 separate core 266 from member 261 in Figure 6. A piston 272 forming a seat 273 for the check valve ball member 268 is reciprocally disposed in an internal cylindrical bore 274 with a piston seal 275 therebetween in by-pass cap 260 with a spring 276 serving to bias the piston 272 out of engagement with the ball 268 with respect to the valve member 261. As long as the fluid pressure in conduit 256 from hydraulic pump 252 is too low to move the piston 272 in opposition to the biasing of spring 276, the ball 268 cannot seat in sealing engagement on seat 273 of the piston 272. During this time, the by-pass through the conduit 264 from the reservoir is effective through passages as shown in the by-pass valve cap 260 so that the hydraulic pump is not added as a load against the windmilling power unit.

As outlined above, the radial movement of each flyweight 48 is translated into change of blade angle by preventing the flyweight from rotating about the blade root and by having a helical spline on the bore of the flyweight which drives a mating spline on the blade root sleeve 128—129 which, in turn, drives the blade. Thus, blade angle change is a slave to movement of the flyweight with the full governing excursion of the blade corresponding to the total movement of the flyweight. Since the governing excursion of the blades is sufficient to furnish the range of powers required over the specified range of air speed and altitude conditions, all operation will be at a speed within the governing range. Depending upon the structural and design details, this speed can be above or below the sonic barrier of 1.00 Mach.

The mechanical "droop" type governor used in the air-driven power unit of the present invention has several advantages over other windmill "droop" governors. They are as follows: (1) The spring mass functions as a flyweight reducing the total spring-flyweight mass required. (2) Movement of the flyweight is in line with centrifugal force allowing maximum utilization of the flyweight mass for generation of the governing force. (3) Movement of the flyweight along a path other than rotation with the blade permits the use and adjustment of mechanical advantage between the governor movement and the blade movement. (4) The flyweight centrifugal force loads only the spring and hub so that no friction is generated by this force. (5) No friction force exists between the flyweight centrifugal force and the spring force since they oppose each other directly with no intervening bearing being required. (6) The space along the axis of the emergency air-driven power unit in the present invention is left available for the addition of remotely controlled feathering mechanism. (7) The graphical curve of blade angle versus speed is linear, thus facilitating analysis of conditions at all times.

It must be noted, however, that the above cited advantages relative to governing and basic design are compromised to some degree by the following considerations. Governing is affected by the existence of blade torques other than those available from the governor. These torques are as follows: (1) Blade centrifugal twisting moment. (2) Aerodynamic twisting moment. (3) To allow the blades to be lifted away from the governor for feathering, the governor is allowed to drive the blades only toward increase blade angle. To insure that the blades always want to go toward decrease blade angle so that they stay against the governor during operation, two additional springs 244 placed diametrically opposite each other relative to the blade coordinator slider 22 at 90° to the high lead screw shafts 188 and parallel to the center line of the axis of the driver shaft 76 exert a force against the blade coordinating slider in the direction of decreasing blade angle between positive pitch blade angles of approximately 55° to 90°. The force exerted by the springs 244 is large only at large blade angles (approaching the 90° feathering angle which is parallel to the center line or axis of the driver shaft 76 as shown in Figure 2). Accordingly, this force is used to drive the blades out of feather and to provide an elastic feather stop. (4) Blade bearing friction. (5) Blade seal friction. (6) Friction in the blade coordinating mechanism due to the springs 244 loading the blade coordinator slider 22 and due to differences between the net blade torques. (7) Friction in the drive between the blades and the governor resulting from the above loads as they are transmitted through this drive including the mating spline connection.

Briefly summarizing, the feathering system comprises: (1) A direct current brake solenoid, a brake spring, and brake plate (which are fixed to the stationary power unit support except that the spring moves the brake plate axially away from the solenoid when the latter is deenergized). (2) A feathering drive gear which rotates with the hub or spinner during governing but is stopped from rotating by the axially movable brake plate after rotating relative to the hub to shift the blade coordinator slider to feathered position of the blades. (3) Two high lead screws which rotate with the hub but are rotated on their own axis by the feathering drive gear when the brake is engaged and hub or spinner is rotated by windmilling. (4) A feathering plate which rotates with the hub but is driven axially when the high lead screws are rotated on their axes. Movement of this plate in the direction for feathering picks up the blade coordinating slider and drives the blades to the feather position. The two light springs (224) between the feathering plate and the hub hold the feathering plate away from the blade mechanism during governing. Thus, there is no connection between the feathering system and the blades during governing.

The sequence of operation for effecting feathering is as follows: (1) The pilot deenergizes the brake solenoid. (2) The brake spring moves the brake plate against the feathering drive gear. (3) Brake drag or reaction force on the master gear causes rotation of the feathering drive gear relative to that of the hub. (4) High lead screws rotate on their axes, move the feathering plate axially against a light spring load (springs 224) until the plate picks up the blade coordinating slider. Further movement of the feathering plate lifts the blades from the governing mechanism (disengages splines 133—134 in "lost motion") and drives the blades into the feather position. (5) Movement of the blades in the direction of feathering is opposed by the pair of diametrically opposite spaced springs (244) at 90° to the high lead screws parallel to the center line or axis of the driver shaft (76). These springs serve as an elastic feather stop. In feathering from any flight condition, the unit stops rotation when the blades have reached a high enough angle such that the windmilling torque has dropped to a value which is insufficient to further compress the pair of springs (244). It can be seen that the feather angle increases with increasing impact pressure and closely approximates the minimum drag angle at high impact pressures. (6) In the event that the blades pass the feather angle and reach a solid stop (engagement of slider 22 with bearing 62) before rotation of the power unit ceases, the feathering drive brake slips until rotation ceases. Then the reverse windmill torque and the spring force from the pair of springs (244) drive the unit reciprocally until the elastic stop equilibrium is reached.

The unfeathering sequence is a follows: (1) The pilot energizes the solenoid releasing the brake. (2) The power unit is free to rotate because brake reaction force is no longer applied to the gearing while the elastic feather stop springs urge the blade coordinating slider forward thereby moving the blades out of feather position to a pitch angle at which the blades bite into the wind and rotation begins. Meanwhile, the pair of springs (244) drive the blade coordinating slider mechanism to a blade angle at which there is sufficient rotative speed and centrifugal twisting moment on the blades to carry them and the feathering mechanism away from the elastic feather stop position toward the low blade angle stop. (3) The unit continues to accelerate until its speed is within the governing range and then the governor begins to function with splines 133—134 engaging to lift the blades away from the feathering mechanism.

While the embodiment of the present invention as herein disclosed constitutes a preferred form, it is to be understood that other forms might be adopted.

What is claimed is as follows:

1. An air-driven power unit comprising, in combination, a stationary hollow shaft with a spinner housing assembly rotatably journalled to windmill thereon, a plurality of variable pitch propeller blades rotatably journalled in said spinner assembly, a driven shaft operably attached to said spinner assembly and rotatable in said hollow shaft with said spinner assembly, centrifugal governor means operably engageable with said blades in said spinner to adjust pitch angle of said blades only toward an increased pitch position due to only one-way driving engagement between said centrifugal governor means and said blades, feathering means operably engageable with said blades, and means for actuating said feathering means operably included in said unit while effecting disengagement of the one-way driving engagement of said centrifugal governor means from operative cooperation with said blades.

2. A ram air-driven turbine to provide power for aircraft components comprising, in combination, a spinner rotatably carried by a fixed support, a plurality of impeller blades journalled for pitch changing movement in said spinner, linear "droop" governor means including centrifugally responsive flyweights effective only in one direction of movement to adjust pitch angle of each of said blades, a helical spline connection between said flyweights and said blades drivingly engaged only to urge movement of said blades to increased pitch position thereby to slave movement thereof to operation at a speed within the governing range, and feathering means including a blade coordinating slider operably engageable with said blades, gearing means operable to reciprocate said slider to feather and unfeather positions, brake means operable through said gearing to effect feathering of said blades, and a solenoid energizable to release said brake means for permitting the blades to unfeather with rotation in the operative governing range of the governor and blades, said solenoid when de-energized being ineffective on said brake means which then exert a drag and/or reactive force on said gearing means resulting in movement of said slider in one direction for disengaging said helical spline connection between said flyweights and said blades.

3. An air-driven propeller comprising, a hub, a plurality of blades rotatably journalled in said hub for pitch adjustment, a rotatable shaft connected with said hub so as to be driven by said blades, centrifugally responsive means helically splined to rotate each of said blades only toward an increased pitch angle upon linear radial outward movement of said centrifugally responsive means, resilient means operatively connected with each of said blades for opposing movement of said centrifugally responsive means, means operably disposed for selective actuation to feather said blades including disengagement from the helically splined engagement only toward increased pitch angle to preclude movement of said blades to increase pitch angle by said centrifugally responsive means by holding said blades to a high pitch position, and release mechanism operable to unfeather said blades for rotation in the operative speed range of said centrifugally responsive means with helical splined driving engagement to rotate each of said blades only toward increased pitch angle.

4. An air-driven propeller comprising a hub, a plurality of blades rotatably journalled in said hub for pitch adjustment, a rotatable shaft connected with said hub so as to be driven by said blades, centrifugal speed responsive means helically splined to rotate each of said blades only toward an increased pitch angle upon linear radial outward movement of said speed responsive means, resilient means cooperating with twisting moments of said blades in equalizing the force of said centrifugal speed responsive means to effect a pitch setting of said blades within a predetermined operating speed range, a blade movement coordinating means cooperable with said blades between low and high pitch angles, means for disengaging the helically splined rotative engagement between said blades and said centrifugal responsive means to effect feathering movement of said coordinating means and blades to a high pitch position, and a release means for disengaging said blades from a high pitch position to permit windmilling of the propeller in unfeathered pitch angles within an operating range during engagement of said centrifugal speed responsive means helically splined to rotate each of said blades only toward an increased pitch angle while said resilient means in addition to aerodynamic and centrifugal twisting moments of said blades maintain the engagement in equalizing the force of said centrifugal speed responsive means.

5. An air-driven propeller mechanism including a hub, a plurality of blades rotatably journalled therein, a rotatable shaft connected with said hub to be rotated thereby upon windmilling of said blades, a blade coordinating means operably disposed with said blades and movable therewith during movement of said blades for low and high pitch positioning, a flyweight concentrically disposed with each of said blades and linearly movable in a radial direction in said hub, helical splines interconnecting each of said flyweights with said blades, said flyweights drivingly engaging said blades through said splines for rotating said blades only toward increased pitch position to effect pitch changing blade rotation slaved to air velocity windmilling of said mechanism, resilient means disposed exerting force radially inwardly relative to said hub to counteract centrifugal force of said resilient means and each flyweight to equalize centrifugal force thereof, said resilient means exerting force opposing the centrifugal force of said resilient means and each flyweight in addition to the opposition thereto by inherent forces of aerodynamic twisting moment of ram air striking the air-exposed blades and centrifugal twisting moments of said blades, a gearing means operably disposed in said hub, braking means engageable with said gearing means to effect a reaction force thereon, a feathering plate movable by said gearing due to the reaction force of said braking means to engage and shift the coordinating means with the blades to a high pitch position, and brake release means operable to disengage said braking means to permit rotation of said gearing means moving said plate from said blade coordinating means.

6. A ram air-driven power unit having a variable pitch propeller with blade angle control and feathering, comprising, a hollow stationary support, a hub rotatably journalled thereon, a driven shaft extending through the hollow support for power take-off rotatable with said hub, a plurality of blades rotatably journalled in said hub to windmill therewith, a linearly movable annular radially reciprocal flyweight disposed with each blade, a spring biasing each flyweight towards the hub shaft, helical means connecting said flyweights and blades to effect pitch changing rotation of said blades slaved to the radially biased speed-responsive reciprocating flyweights, a blade coordinator slider having an annular sleeve portion reciprocal on said hollow support, a roller carried on said sleeve portion for each blade, a bifurcated member attached to the hub end of each blade engageable with said roller, a first pair of diametrically-opposed radially protruding flanges carried by said sleeve portion, a pair of springs biasing said slider to an unfeathered blade position acting between said hub and first pair of flanges, said pair of springs acting also as a resilient high pitch stop, a second pair of diametrically opposed radially protruding flanges carried by said sleeve portion, a pair of high lead screws rotatably journalled in said hub extending through apertures in said second pair of flanges, a feathering plate with a pair of nuts threadedly engaging said high lead screws, spring means between said hub and feathering plate urging separation thereof from said slider, a master gear rotatable on said hollow support, a feathering gear carried by said high lead screws meshing with said master gear to be rotatable thereby, a brake plate non-rotatable but axially movable on said hollow support frictionally engageable with said master gear, a brake release solenoid assembly carried by said hollow stationary support energizable to separate said brake plate from said master gear, and a spring means disposed between said solenoid assembly and brake plate to cause brake engagement during solenoid deenergization, said brake plate upon solenoid deenergization providing reaction force upon said master and feathering gear to engage and shift said slider against said pair of springs to move said blades by said roller and bifurcated member to a high pitch feather stop position.

7. A mechanism for converting windmill force to torque for operation of aircraft components, comprising, a stationary support, a hub rotatable thereon, a plurality of blades rotatably journalled in said hub for pitch adjustment, linear "droop" governor means reciprocally disposed with each blade and helically connected thereto, resiliently opposed flyweights included with said governor means, said flyweights having one-way driving engagement with said blades for setting pitch angle according to equilibrium of centrifugal force of said flyweights against resilient opposition in addition to opposition due to inherent aerodynamic and centrifugal blade twisting moments within a range of rotative speeds, a brake plate non-rotatable but axially movable on said support, a feather-effecting gearing engageable by said brake plate, a solenoid carried by said support energizable to separate said brake plate from said gearing, a spring means between said gearing and solenoid causing brake engagement upon solenoid deenergization, a blade coordinating slider movably journalled on said support operably engaged to shift blade angle, and a feathering plate movable by said gearing into engagement with said slider, said brake engagement effecting feathering movement of said slider through engagement by said gearing of said feathering plate with said slider effecting disengagement of the one-way driving engagement of said flyweights with said blades.

8. In an air-driven variable pitch propeller mechanism including a stationary support with a hub rotatable thereon and blades rotatably journalled in the hub with linear "droop" governor means operably connected to each blade for slaving pitch angle to an equilibrium of moments with propeller speed, feathering means with the mechanism comprising a pair of high lead screws rotatably journalled in the hub, a feathering gear carried by said screws and rotatable therewith, a master gear rotatably journalled on the support meshing with said feathering gear, a blade coordinating means operably movable on the support in pitch changing engagement with the blades, a feathering plate movable on said screws to engage said coordinating means, spring means between the hub and said feathering plate urging disengagement thereof from said coordinating means during air-driven operation of said mechanism, a brake plate non-rotatable but axially movable on the support into and out of engagement with said master gear, a solenoid carried by the support energizable to retract said brake plate from engagement with said master gear, and a spring means disposed between said solenoid and brake plate urging engagement thereof with said master gear upon deenergization of said solenoid, said brake plate effecting relative rotation between said master gear and feathering gears to cause shifting of said coordinating means to a high pitch feathering position of said blades.

9. In combination with an air-driven power unit, including, a stationary support, a hub rotatable thereon, a plurality of blades rotatably journalled in the hub, and a linear "droop" governor means operably connected to the blades by flyweights having only one-way driving connection with the blades for effecting pitch setting thereof slaved to an equilibrium of moments within a range of windmill speeds, a feathering means comprising blade coordinating means movably mounted on the support, a gearing means operable to effect movement of said coordinating means to a high pitch blade feather position, a braking means operably disposed on the support to engage said gearing means effecting feathering movement of said coordinating means, and brake release means operably disposed on said support for disengaging said feathering means from the coordinating means allowing variable pitch windmill operation of the power unit, said braking means in effecting feathering also effecting disengagement of the one-way driving connection of the flyweights relative to the blades through movement of said coordinating means by said gearing means.

10. An air-driven power unit comprising, in combination, a stationary support with a hub rotatably journalled to windmill thereon, a plurality of variable pitch propeller blades rotatably journalled in said hub, a driven shaft operably attached to said hub and rotatable thereby, governor means operably engageable with said blades in said hub to adjust pitch angle of said blades only toward an increased pitch position due to only one-way driving engagement between said centrifugal governor means and said blades, feathering means operably engageable with said blades, and means for actuating said feathering means operably included in said unit while effecting disengagement of the one-way driving engagement of said centrifugal governor means from operative cooperation with said blades.

11. An air-driven power unit comprising, in combination, a stationary support with a hub rotatably journalled to windmill thereon, a plurality of variable pitch propeller blades rotatably journalled in said hub, a driven shaft operably attached to said hub and rotatable thereby, governor means operably engageable with said blades in said hub to adjust pitch angle of said blades only toward an increased pitch position due to only one-way driving engagement between said governor means and said blades, and blade coordinating means movably mounted on said support cooperable with said blades in pitch changing movement thereof, said governor means including as weight both linearly movable annular radially reciprocable flyweights disposed with each of said blades and spring means forming part of the flyweight total weight, said spring means exerting force radially inwardly relative to said hub to counteract centrifugal force of said spring means and each flyweight in addition to the opposition to centrifugal force of said spring means and each flyweight by inherent forces of aerodynamic twisting moment of ram air striking said blades and centrifugal twisting moments of said blades for urging continued engagement of the one-way driving engagement in the operating governing range of said air-driven power unit.

12. A mechanism for converting windmill force to torque for operation of aircraft components, comprising, a stationary support, a hub rotatable thereon, a plurality of blades rotatably journalled in said hub for pitch adjustment, linear "droop" governor means reciprocally disposed with each blade and including flyweights drivingly engaged helically to urge rotation of said blades only to increased pitch position thereby setting pitch angle according to equilibrium of force of said governor means against inherent force of blade aerodynamic and twisting moments within a range of rotative speeds, and a blade coordinating means movable linearly and journalled on said support while operably engaged with said blades in shifting blade angle by said governor means, said governor means also including as weight a spring means forming part of the flyweight total weight, said spring means exerting force radially inwardly relative to said hub to counteract centrifugal force of said spring means and each flyweight in addition to the opposition to centrifugal force of said spring means and each flyweight by inherent forces of aerodynamic twisting moment of ram air striking said blades and centrifugal twisting moments of said blades for urging continued engagement of the helically drivingly engaged urging of rotation of said blades only to increased pitch position by said flyweights.

13. An air-driven propeller comprising, a hub, a plurality of blades rotatably journalled in said hub for pitch adjustment, a rotatable shaft connected with said hub so as to be driven by said blades, centrifugally responsive means helically splined to rotate each of said blades only toward increased pitch angle upon linear radial outward movement thereof, resilient means operatively connected with each of said blades for opposing movement of said centrifugally responsive means, and blade coordinating means being movable linearly and being journalled on said support so as to be operably engaged with said blades in shifting blade angle of each of said blades by radial outward movement of said centrifugally responsive means opposed to maintain helically splined engagement through additive effect of the force of said resilient means and inherent forces of aerodynamic twisting movement of ram air striking said blades and centrifugal twisting moments of said blades for urging continued engagement of said flyweights helically with said blades.

14. An air-driven propeller comprising a hub, a plurality of blades rotatably journalled in said hub for pitch adjustment, a rotatable shaft connected with said hub so as to be driven by said blades, centrifugal speed responsive means helically splined to rotate each of said blades only toward increased pitch angle upon linear radial outward movement thereof, resilient means cooperating with inherent aerodynamic and twisting moments of said blades in equaling the force of said centrifugal speed responsive means to effect a pitch setting of said blades within a predetermined operating speed range, and a blade movement coordinating means journalled in said hub cooperable with said blades between low and high pitch angles, said resilient means and the aerodynamic and twisting moments exerting a resultant force to maintain helically splined engagement of said blades by said speed responsive means.

15. An air-driven propeller mechanism including a hub, a plurality of blades rotatably journalled therein, a rotatable shaft connected with said hub to be rotated thereby upon windmilling of said blades, a blade co-ordinating means operably disposed with said blades and movable therewith for high and low pitch positioning, a flyweight concentrically disposed with each of said blades and linearly movable in a radial direction in said hub, helical splines interconnecting each of said flyweights with said blades and urging only movement to increased pitch position during pitch changing blade rotation slaved to air velocity windmilling of said mechanism, and resilient means disposed with each flyweight to equalize centrifugal force thereof with the resilient means being aided by inherent aerodynamic and twisting moments of said blades.

16. The combination, comprising, an air-driven propeller mechanism including a hub, a plurality of blades rotatably journalled therein, a rotatable shaft connected with said hub to be rotated thereby upon windmilling of said blades, a blade sleeve adapter having a plurality of external helical splines attached to the root portion of each blade, governor means including a flyweight having a sleeve portion extending longitudinally of the blade root portion, said sleeve portion being provided with internal helical splines cooperable with the external helical splines of said blade sleeve adapter only to drive said blades toward increased pitch position, and resilient means included with said governor means extending longitudinally of each blade root between said flyweight and hub controlling radial movement of said flyweight relative to said hub to cause each blade to be rotated for pitch changing movement between high and low pitch positioning by cooperation of the helical splines even though said flyweight can drive said blades only toward increased pitch position through said helical splines.

References Cited in the file of this patent

UNITED STATES PATENTS

| | | |
|---|---|---|
| 656,834 | Blanchard | Aug. 28, 1900 |
| 2,049,954 | Gilbert | Aug. 4, 1936 |
| 2,416,541 | Olman | Feb. 25, 1947 |
| 2,550,229 | Cotton | Apr. 24, 1951 |
| 2,777,524 | Chapman et al. | Jan. 15, 1957 |